United States Patent [19]

Pickens

[11] 4,142,171

[45] Feb. 27, 1979

[54] EFFICIENT APPARATUS FOR PROJECTING ACOUSTIC WAVES

[75] Inventor: George O. Pickens, San Diego, Calif.

[73] Assignee: The United States of America as represented by the Secretary of the Navy, Washington, D.C.

[21] Appl. No.: 758,108

[22] Filed: Jan. 10, 1977

[51] Int. Cl.² .......................................... H04B 13/00
[52] U.S. Cl. ................................. 340/12 R; 340/8 R; 340/8 PC
[58] Field of Search ...................... 340/8 R, 9, 10, 12, 340/13, 8 MM, 8 PC, 8 LF, 7 PC; 310/337, 321

[56] References Cited

U.S. PATENT DOCUMENTS

| | | | |
|---|---|---|---|
| 2,405,179 | 8/1946 | Belack, Jr. et al. | 340/8 R |
| 2,505,519 | 4/1950 | Beranek | 340/8 PC |
| 2,802,196 | 8/1957 | Fry et al. | 340/10 |
| 3,137,835 | 6/1964 | Bielecki et al. | 340/8 |
| 3,676,840 | 7/1972 | Baip | 340/12 R |
| 3,760,346 | 9/1973 | Kieser et al. | 340/8 R |
| 3,803,544 | 4/1974 | Wallen | 340/12 R |
| 4,001,765 | 3/1975 | Sims | 340/8 PC |
| 4,030,063 | 6/1977 | Wallen | 340/12 R |

Primary Examiner—Harold J. Tudor
Attorney, Agent, or Firm—Richard S. Sciascia; Ervin F. Johnston; James O. Skarston

[57] ABSTRACT

In an apparatus for projecting low-frequency acoustic waves in a liquid media, a chamber adapted to be immersed in the media contains gaseous material to provide a compliance and is provided with an aperture. A piston of selected mass is sealably mounted in the aperture, having one end adapted to displace a selected mass of the liquid media and the other end adapted to displace the gaseous material in the chamber. An actuating device is coupled to the piston for reciprocating it at the resonant frequency of a mechanical system which substantially comprises the compliance provided by the contained gaseous material, the mass of the piston, and the mass of the displaced liquid media.

14 Claims, 5 Drawing Figures

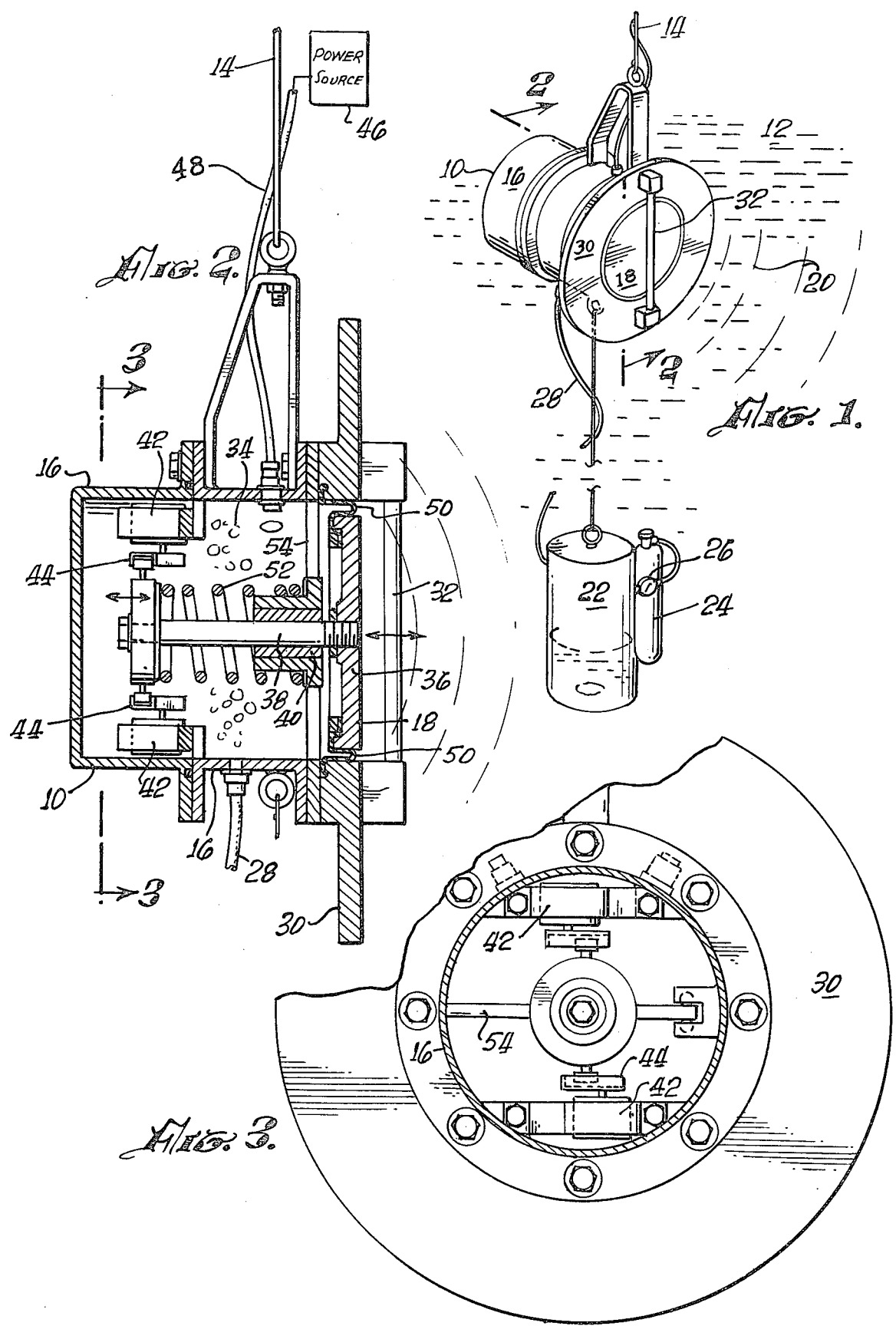

EFFICIENT APPARATUS FOR PROJECTING ACOUSTIC WAVES

STATEMENT OF GOVERNMENT INTEREST

The invention described herein may be manufactured and used by or for the Government of the United States for governmental purposes without the payment of any royalties thereon or therefor.

BACKGROUND OF THE INVENTION

The present invention pertains generally to a means for projecting acoustic waves in a body of water or other liquid media, and more particularly to such apparatus having improved power efficiency.

The projection of low-frequency (5–100HZ) acoustic signals in a liquid media, such as water contained in an ocean body or in a man-made tank, is required for various purposes which are well known to persons skilled in the art, e.g. to calibrate certain types of sonar equipments. Generally, an acoustic projection system provides a piston or other radiator which is reciprocably moved to project a train of waves, wherein the frequency of the waves is equal to the frequency of reciprocation, and the power required by the system to generate the wave train is determined by the resistive and reactive load components thereupon. The resistive load component generally comprises the energy transferred by the radiator to the projected waves, and the reactive load component comprises energy expended in accelerating the mass of the radiator and the mass of water adjacent to the radiator in back-and-forth movements.

As is well known in the art, if the dimensions of the radiator of an acoustic projection system are small compared with the wavelengths of projected waves, the reactive component of the load on the system is much larger than the resistive load, whereby the efficiency of the system is quite low. Since low-frequency acoustic waves may have wave lengths in excess of 500 feet, low-frequency projection systems are very likely to be characterized by such inefficiency, and unless the inefficiency is compensated for in some manner, power required to operate such systems may have to be provided by a substantial power source. In some presently available low-frequency projection devices, power must be supplied by a ship's engine and coupled to the device through hydraulic or other large, and hence inefficent energy transfer mechanisms. Such substantial power sources and transfer mechanisms are expensive, cumbersome, and may not even be available for numerous situations requiring the projection of low-frequency acoustic waves.

SUMMARY OF THE INVENTION

The invention herein described and claimed provides an apparatus for projecting low-frequency acoustic waves in liquid media wherein wave generation efficiency may be significantly improved over presently available low-frequency projectors. In the invention, a chamber which is adapted to be immersed in the liquid media and which contains a gaseous material to provide a selected compliance, is provided with an aperture within which a piston of selected mass is sealably mounted. One end of the piston is adapted to displace a selected mass of the liquid media, and the other end is adapted to displace the gaseous material. An actuating means is coupled to the piston to reciprocate it at the resonant frequency of a mechanical system which substantially comprises the compliance provided by the gaseous material contained in the chamber, the mass of the piston, and the mass of the displaced liquid media, whereby acoustic waves are generated at the most efficient frequency at which the apparatus may operate. To further improve the efficiency of the apparatus, the piston may be sealably mounted within the aperture by a near-frictionless sealing means, such as a rolling seal, whereby resistance to movement of the piston caused by the seal is negligible. In some embodiments of the invention, a movable member contained in the chamber may be varied as a function of the pressure of the liquid media adjacent to the apparatus, whereby a constant resonant frequency is maintained as the vertical displacement of the chamber in the media is varied.

STATEMENT OF THE OBJECTS OF THE INVENTION

A primary object of the present invention is to provide an apparatus for projecting acoustic waves in a liquid media which operates with improved efficiency.

Another object of the invention is to minimize the power requirement of an apparatus for projecting low-frequency acoustic waves in a liquid media.

Another object of the present invention is to provide a reciprocating apparatus for projecting acoustic waves in a liquid media which operates at the resonant frequency of a mechanical system substantially comprising the mass of a reciprocating piston, the mass of liquid media displaced by the piston, and the compliance of enclosed gaseous material displaced by the piston.

Yet another object of the invention is to provide a reciprocating system for projecting acoustic waves in a liquid media which is operated at its resonant frequency, wherein the resonant frequency remains constant for varying vertical displacements of the apparatus in the liquid media.

Other objects of the invention will become more readily apparent from the ensuing description when taken together with the drawings.

BRIEF DESCRIPTION OF THE DRAWINGS

FIG. 1 is a perspective view showing an embodiment of the invention.

FIG. 2 is an axial section taken along line 2—2 of FIG. 1.

FIG. 3 is a sectional view taken along line 3—3 of FIG. 2, with a portion broken away.

DESCRIPTION OF THE PREFERRED EMBODIMENT

Figure 4:
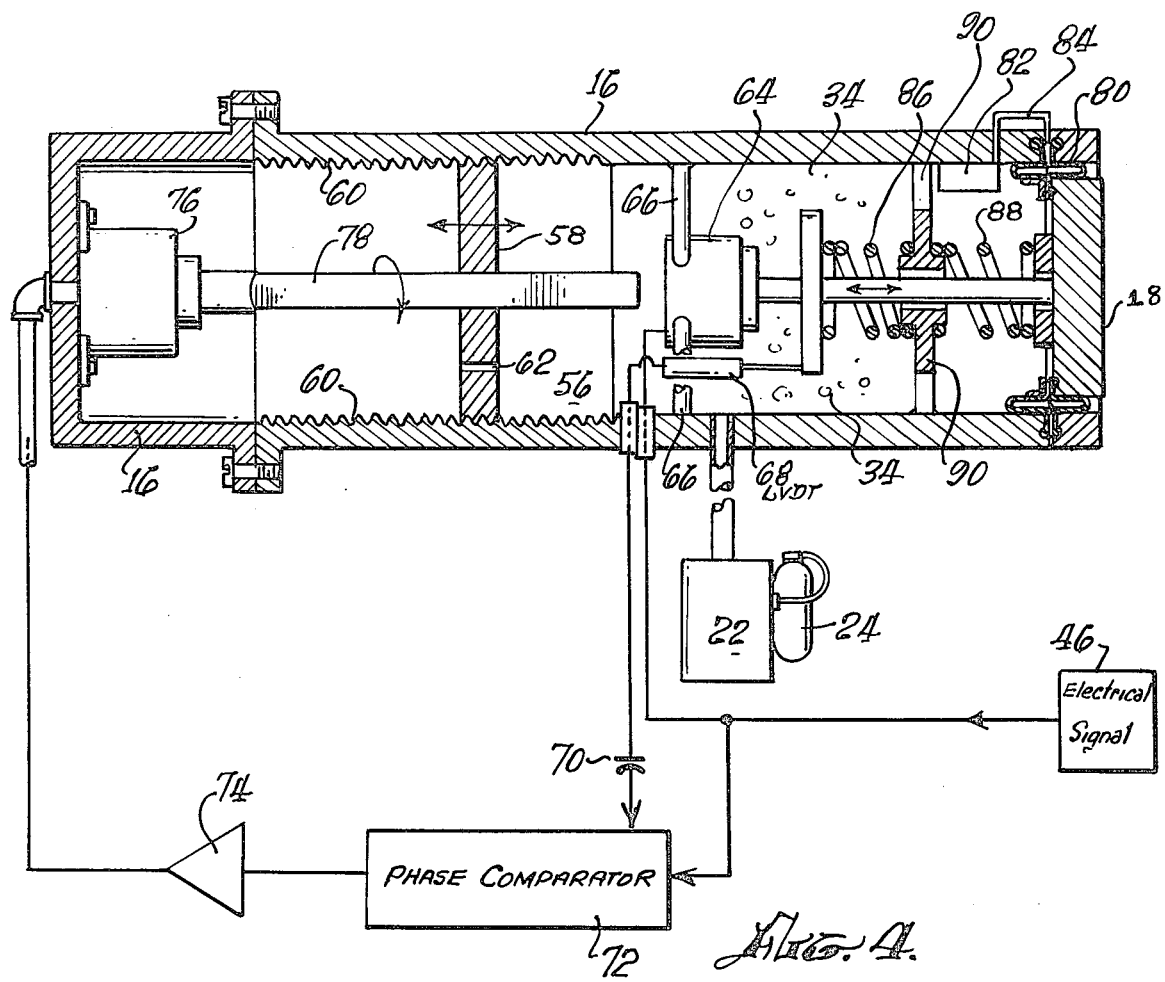
FIG. 4 is a schematic sectional view showing a modification of the acoustic projector of FIG. 1.

Referring to FIG. 1, there is shown an acoustic sound projector 10 embodying principles of the invention herein disclosed which is immersed in a liquid media 12 to a selected depth, for example, by suspending it from cable 14. Media 12 may comprise an ocean or other natural body of water or water of selected salinity contained in a man-made tank, although it is not intended to limit the invention thereto. Chamber 16, which may be a rigid cylinder, has a circular aperture or opening at one end which is substantially filled by the head of a piston 18, the shaft of piston 18 being contained in the interior of chamber 16. An actuating mechanism hereinafter described is also contained within chamber 16 and is coupled to piston 18 to reciprocate it at a selected frequency, e.g. 40Hz in the range (5–100)Hz, whereby acoustic waves 20 of the selected frequency are generated and projected through media 12.

For reasons hereinafter described, it may be necessary to maintain the pressure within chamber 16 at a higher level than the hydrostatic pressure of media 12 adjacent to projector 10. To maintain such pressure differential, free-flooding tank 22, which may comprise a generally cylindrical tank with an opening in the bottom thereof, is suspended at a selected depth beneath chamber 16, air supply 24 being coupled into tank 22 through regulator 26 to ensure that a minimum amount of air is maintained in tank 22. A tube 28 or other air passage is coupled between the interior of tank 22 and the interior of chamber 16, whereby the pressure inside chamber 16 will be equal to the pressure within tank 22. It will be readily apparent to one skilled in the art that the pressure within tank 22 is greater than the pressure of the liquid media surrounding the projector 10, whereby the pressure within the chamber 16 will be maintained at the desired higher level. If tank 22 is suspended at a depth of 15 feet beneath projector 10 in seawater, the pressure differential will be 6–7 psi.

An annular plate 30 is affixed to chamber 10 around the aperture thereof, plate 30 having sufficient radial dimension to enable projector 10 to generate acoustic waves 20 with substantially the same effect as a system wherein piston 18 reciprocates through an aperture in an infinite planar barrier.

As a safety feature in the event piston 18 is caused to blow out of chamber 16 by the pressure differential, blow out bar 32 is positioned across the face of piston 18 and spaced outwardly therefrom a sufficient distance to avoid interfering with movements of piston 18, the ends of bar 32 being securely affixed to plate 30.

Referring to FIG. 2, there is shown a gaseous material 34, such as helium or air, contained within chamber 16, the gaseous material providing the compliance, or spring constant, of an oscillating or reciprocating system wherein a movable mass, comprising the sum of the masses of piston 18 and the liquid media displaced thereby, is periodically accelerated by the application of a force thereto. As is well known in the art, in such an oscillating system there is a continual energy exchange, between the kinetic energy of the mass, as piston 18 reciprocates back and forth about a selected neutral position, and the potential energy stored in gaseous material 34, as gaseous material 34 is expanded and compressed by successive reciprocations of piston 18. As is also well known, if the movable mass is reciprocated at the resonant frequency of the system, the force required to maintain reciprocation is at a minimum, or in other words, the system is most efficiently operated at the resonant frequency thereof. Consequently, by judicious selection of the type and amount of gaseous material 34, of the mass and dimensions of piston 18, and of the interior dimensions of chamber 16, projector 10 may be so designed that its resonant frequency is the aforesaid selected frequency of acoustic wave projection, whereby projector 10 may be operated with maximum efficiency.

It will be readily apparent that the rear portion of chamber 16 may comprise a removable back cap, and that by providing back caps of different sizes, projector 10 may be quickly structured to have one of a number of discrete resonant frequencies.

Referring further to FIG. 2, it is shown that piston 18 comprises a head member 36 and a shaft member 38, which is mounted in chamber 16 by means of near frictionless bearings 40 or the like, piston head 36 substantially filling the aperture of chamber 16. The aforementioned actuating mechanism may comprise electric motors 42, which are brushless DC torque motors of limited angular rotation, and are mechanically linked to piston shaft 38 by means of channel rollers 44 to reciprocate piston 18 in one degree of freedom at the aforesaid resonant frequency. Motors 42 may be cooperatively driven at the resonant frequency by coupling thereto an electrical driving signal of the same frequency from a power source 46 through electric cable 48, power source 46 comprising, for example, a compact and very mobile arrangement of batteries and signal generator.

To prevent leakage, an annular rolling seal 50 is affixed around the periphery of the aperture of chamber 16 between piston head 36 and the edges of chamber 16 surrounding the aperture. Rolling seal 50 comprises a well known sealing mechanism, which provides negligible resistance to moving parts to which it is coupled. To prevent excessive wear, seal 50 should remain billowed either outward from or inward toward chamber 16, which is achieved by providing the aforementioned pressure differential. To compensate for the pressure differential, i.e. to maintain the aforesaid neutral position about which piston 18 reciprocates, and also to prevent piston 18 from being blown out of chamber 16 by the pressure differential, a restraining or bias spring 52 is coupled between piston 18 and rigid bars 54, which are securely affixed to chamber 16.

Referring to FIG. 3, there are shown motors 42, channel rollers 44, and bars 54 in further detail.

In certain applications a low frequency acoustic projector immersed in liquid media may be subject to varying vertical displacement, for example, where the projector is suspended from a floating buoy which rises and falls according to surface wave motion. Because the projector is vertically displaced, the pressure of the liquid media adjacent thereto varies, whereby the compliance provided by gaseous material 34 may vary enough to change the resonant frequency of the projector. Referring to FIG. 4, there is shown a modified acoustic projector wherein the resonant frequency is kept constant by varying volume 56, the volume of chamber 16 within which gaseous material 34 is contained, in response to variations of the vertical displacement of the projector to compensate for changes of compliance resulting therefrom. Volume 56 is varied by rotating threaded disk 58, which comprises a rigid plate mounted in threads 60 in the interior wall of chamber 60, disk 58 moving along the length of chamber 16 when it is rotated. Aperture 62 passes through disk 58 and is of small enough dimension in relation to chamber 16 that the remainder of the volume of chamber 16, i.e., the portion of the volume not included in volume 56, is substantially acoustically isolated from the reciprocating system at the resonant frequency. At the same time, aperture 62 is large enough in relation to chamber 16 to permit compensating air to communicate between the volumes separated by disk 58, whereby they may be maintained at substantially the same pressure.

To rotate disk 58, an electro-mechanical feedback loop is coupled between disk 58 and piston 18, piston 18 being reciprocated by linear motor 64. Linear motor 64, which may comprise the aforesaid motors 42 or other suitable actuating mechanism, is affixed to chamber 16 by rigid bars 66 and is driven by an electrical driving signal from power source 46, there being a fixed phase relationship between the driving signal and the reciprocal motion of piston 18. A linear variable differential transformer 68 (LVDT), a well known electromechanical device, has a movable mechanical member coupled to piston 18, so that the member is moved in phase with piston 18, whereby LVDT 68 generates an electrical feedback signal which also has a fixed phase relationship with the motion of piston 18. The feedback signal from LVDT 68 is coupled through a capacitor 70, to remove any DC component therefrom, into phase comparator 72, the electrical driving signal from power source 46 also being coupled thereinto. Comparator 72 comprises any one of a number of well-known devices which generates an error signal functionally related to the phase between two input signals, the error signal being zero when the phase between the driving and feedback signals is at a selected value, which corresponds to reciprocation of piston 18 at the resonant frequency of the projector. If the vertical displacement of the projector varies enough to change the pressure adjacent thereto, the phase of piston 18 will change in relation to the driving signal, whereby the phase between the driving and feedback signals varies from the selected value, and comparator 72 generates an error signal. The error signal is coupled through amplifier 74 to servo motor 76, which is mechanically linked to disk 58 by means of a squared or keyed shaft 78, and which rotates disk 58 to readjust volume 56 until the projector returns to its resonant frequency.

Referring further to FIG. 4, there is shown annular seal 80, which may be employed as an alternative low-friction means for sealing the aperture between chamber 16 and piston 18. Annular seal 80 comprises two rolling seals, one billowed outward from chamber 16 and the other being billowed in towards chamber 16, the edges of the seals being butted together so that they form an annular enclosed space which is filled with oil or other substance of low compressibility. To maintain the pressure of the oil within the seals 80, a constant pressure mechanism 82 may be provided which is coupled into the enclosed space through a tube 84.

If seal 80 is employed in the acoustic projector, it is not necessary to maintain the interior of chamber 16 at a higher level of pressure than the surrounding media. However, it may be desirable to couple the aforementioned free-flooding tank 22 to the interior of chamber 16 and situate it at the same depth as chamber 16 to maintain a pressure within chamber 16 which is substantially equal to the surrounding hydrostatic pressure. The neutral position about which piston 18 reciprocates in the modification shown in FIG. 4 may be provided by coupling restraining springs 86 and 88 between opposite ends of piston 18 and rigid bars 90, which are securely affixed to chamber 16.

Figure 5:
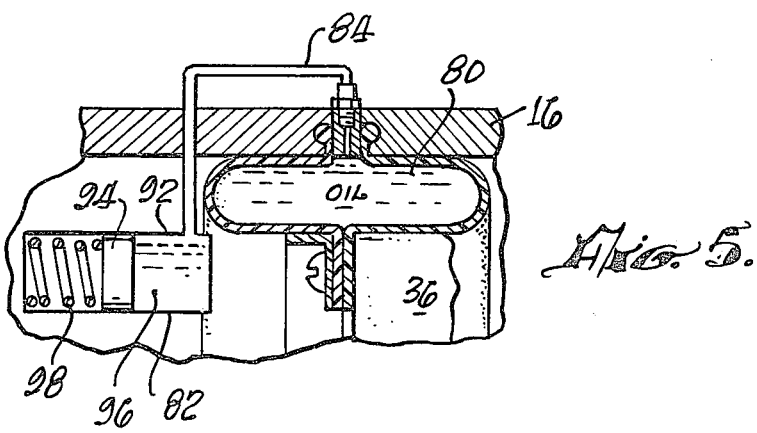
FIG. 5 is an enlarged view of the annular seal shown in FIG. 4.

Referring to FIG. 5, there is shown a mechanism 82 for maintaining a constant oil pressure within seal 80, wherein reservoir 92 containing oil 96 is kept under constant pressure by piston 94 and spring 98.

Method of Operation and Design

To employ the projection system of FIG. 1 to project low-frequency acoustic waves of a selected frequency in an ocean body, projector 10 may be immersed to a selected depth D therein by suspending it from a buoy floating on the surface from cable 14. Tank 22 is suspended from projector 10 to a selected depth beneath projector 10 and motors 42 are driven by power source 46 through electric cable 48. Motors 42 reciprocate piston 18 at the resonant frequency of a mechanical system substantially comprising a moving mass M and a compliance C to realize maximum efficiency of operation. As previously described, M is the sum of the mass of piston 18 and the liquid media displaced thereby, and the compliance is provided by gaseous material 34 contained in a volume V, which is determined by the interior dimensions of chamber 16, although some compliance may also be provided by bias spring 52.

To design a projector 10 having a resonant frequency of 40 Hz, the following procedure may be employed:

Calculate moving mass M $$M = (W_P + W_L/g),$$

where
$W_p$ = weight of piston 18 (lbs.)
$g$ = 32.2 slugs/lb.
$W_L$ = weight of liquid media 12 displaced by piston 18  $0.637\pi\rho a^3$ (lbs.)
$a$ = radius of piston head 36 (ft.)
$\rho$ = density of liquid media (lbs./cu ft.).

Calculate compliance, required to achieve resonance at 40 Hz $$2\pi f = \sqrt{C/M}$$

$$C = M(2\pi f)^2 = m(2\pi\ 40)^2 = 6400 M\pi^2$$

Calculate interior volume V of chamber 16

$$C = C_S + C_G,$$

where
$C_S$ = compliance provided by spring 52
$C_G$ = compliance provided by gaseous material 34 contained in volume V
$P$ = pressure within volume V when projector 10 is immersed in liquid media, P being a function of V.
$P_1$ = pressure at a depth of immersion D $$dP/dV\ |_{P=P_1} = -P_1/V = \frac{C_G}{(\pi a^2)^2} = \frac{C_G}{\pi^2 a^4}$$

$$\text{whereby}\ |V| = \frac{P_1 a^4 \pi^2}{C_g}$$

It may be noted that the above solution of V applies to the isothermal case. V', the volume for the adiabatic case, is approximately 1.4V.

For certain applications, which by no means limit the scope of the invention, D may usefully be selected to be 250 ft., $a$ to be 0.33ft, and $W_p$ to be 6.46 lbs.

To maintain a constant resonant frequency for variable depths of immersion, volume V is varied by displacing disk 58, as previously described and shown in FIG. 4. Disk 58 is displaced by a feedback loop which is sensitive to changes in pressure of the media surrounding projector 10, as the depth of the projector varies.

Obviously, many modifications and variations of the present invention are possible in the light of the above teachings, and, it is therefore understood that within the scope of the disclosed inventive concept, the invention may be practiced otherwise than as specifically described.

What is claimed is:

1. Apparatus for projecting acoustic waves in liquid media, said apparatus comprising:
   a chamber which is adapted to be immersed in said liquid media for retaining a gaseous material to provide a selected compliance, said chamber having an aperture;
   a piston of selected mass sealably mounted in said aperture with one end adapted to displace a selected mass of said liquid media and the other end adapted to cyclically compress and expand said gaseous material;
   actuating means coupled to said piston for reciprocating said piston at the resonant frequency of a mechanical system substantially comprising said compliance, the mass of said piston, and the mass of said displaced liquid media; and
   volume regulating means for determining the volume within which said gaseous material is enclosed when said piston is at a specified position during one of said reciprocations; and
   pressure regulating means for maintaining a selected relationship between the pressure within said chamber and the pressure of said media adjacent to said apparatus.

2. The apparatus of claim 1 wherein annular sealing means are affixed around said piston and also affixed to said chamber around the periphery of said aperture to prevent leakage, said sealing means providing negligible resistance to reciprocation of said piston.

3. The apparatus of claim 2 wherein said actuating means comprises electric motor means which is mounted inside said chamber and mechanically coupled to said piston, an electrical driving signal which has a frequency equal to said resonant frequency being coupled to said motor means.

4. The apparatus of claim 3 wherein:
   said volume regulating means comprises means for varying said enclosing volume in a predetermined relationship with the vertical displacement of said chamber in said liquid media to maintain the frequency of reciprocation of said piston at a single predetermined resonant frequency as the vertical displacement of said chamber varies.

5. The apparatus of claim 4 wherein:
   said volume varying means comprises a movable member contained in the interior of said chamber and a pressure sensing means coupled to said movable member for displacing said movable member in response to variations of the pressure of said liquid media adjacent to said apparatus.

6. The apparatus of claim 5 wherein:
   said pressure sensing means comprises an electromechanical feedback means coupled between said piston and said movable member.

7. The apparatus of claim 6 wherein said electromechanical feedback means comprises:
   an electromechanical element coupled to said piston to generate electrical feedback signal which varies as a function of the displacement of said piston;
   a phase comparator means receiving said electrical driving signal and said electrical feedback signal for comparing the phase therebetween and generating an error signal functionally related to said phase; and
   a servo motor receiving said error signal through an amplification means, said servo motor being mechanically coupled to displace said movable member as a function of said error signal.

8. The apparatus of claim 7 wherein:
   said annular sealing means comprises a pair of annular rolling seals, one of said seals being billowed outward from said chamber and the other of said seals being billowed in toward said chamber, said seals forming an annular enclosed space which is filled with oil.

9. The apparatus of claim 8 wherein said pressure regulating means maintains the pressure within said chamber at a pressure substantially equal to the pressure of said liquid media adjacent to said apparatus, said pressure regulating means comprising:
   a free flooding tank maintained at the same vertical displacement in said liquid media as said chamber;
   a source of air for coupling air into said tank through a regulator to maintain a minimum of air in said tank; and
   means for providing an air passage between the interior of said tank and the interior of said chamber.

10. The apparatus of claim 3 wherein:
    said volume regulating means comprises a removable backcap joined to the rear portion of said chamber, the dimensions of said backcap being functionally related to said resonant frequency.

11. The apparatus of claim 3 wherein said pressure regulating means maintains the pressure within said chamber at a pressure greater than the pressure of said liquid media adjacent to said apparatus, said pressure regulating means comprising:
    a free flooding tank suspended beneath said chamber to a selected level;
    means for coupling air into said tank through a regulator to maintain a minimum of air in said tank; and
    means for providing an air passage between the interior of said tank and the interior of said chamber.

12. The apparatus of claim 11 wherein:
    said annular sealing means comprises an annular rolling seal, said rolling seal being billowed outward from said chamber by the difference between the pressure within said chamber and the pressure of said liquid media adjacent to said chamber.

13. The apparatus of claim 1 wherein said liquid media comprises a natural body of water.

14. The apparatus of claim 1 wherein said liquid media comprises water of selected salinity contained in a tank of selected dimensions.

* * * * *